Patented Oct. 5, 1954

2,691,013

UNITED STATES PATENT OFFICE 2,691,013

BROMOSTEROIDS

Robert Bruce Moffett, Kalamazoo, Mich., assignor to The Upjohn Company, Kalamazoo, Mich., a corporation of Michigan No Drawing. Application March 21, 1952,
Serial No. 277,911

13 Claims. (Cl. 260—239.55)

This invention relates to novel bromosteroids and is more particularly concerned with novel 3-acyloxy-16(17)-oxido - 21 - bromopregnane - 20-ones and to a novel process for the production thereof.

The novel compounds of the present invention are the normal and allo-3-acyloxy-16(17)-oxido-21-bromopregnane - 20 - ones wherein the acyloxy groups have the formula AcO, Ac being the acyl radical of an organic carboxylic acid. These compounds may be represented by the following formula:

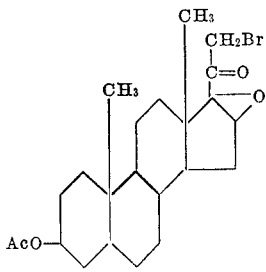

It is an object of the present invention to provide novel allo and normal 3-acyloxy-16(17)-oxido-21-bromopregnane-20-ones. It is another object to provide a novel process for the production thereof. Other objects of the invention will be apparent to those skilled in the art to which this invention pertains.

The compounds of the present invention have utility in the production of known and new steroids having an oxygen atom at carbon atoms 17, 20, and 21, said compounds being members of a class of compounds possessing known physiological activity. For example, 3β-acetoxy-16(17)-oxido-21-bromoallopregnane - 20 - one is converted to the known 3β,21-diacetoxy-16(17)-oxido-pregnane-20-one [Plattner, Ruzicka et al., Helv. Chim. Acta, 30, 395 (1947)].

The novel compounds are prepared by reacting a normal or allo 3,20-diacyloxy-16(17)-oxido-20-pregnene with about one molar equivalent of bromine at room temperature or below room temperature in a solvent such as, for example, methylene chloride, chloroform, and others. Apparently bromine adds to the 20-double bond of a starting 3,20-diacyloxy-16(17)-oxido - 20 - pregnene to produce a corresponding 20,21-dibromo compound which then loses the 20-bromine atom and the acyl radical of the 20-acyloxy group to produce a 20-ketone group, thereby giving a desired 3-acyloxy-16(17)-oxido-21-bromopregnane-20-one. When following the method of the present invention, high yields of the desired 3-acyl-oxy-16(17)-oxido-21-bromopregnane-20-one are consistently obtained with the yield and the time required for completion of reaction being somewhat dependent upon the temperature at which the reaction is carried out and the amount of bromine used. The best yields are usually obtained when the reaction is carried out at temperatures below room temperature and about a molar equivalent of bromine is employed.

The starting compounds for the method of the present invention are prepared by reacting a 3α- or 3β-hydroxy or acyloxy-16-pregnene-20-one with isopropenyl acetate or other isopropenyl acylate such as, for example, isopropenyl propionate, butyrate, octanoate, benzoate, or the like, in the presence of an acid catalyst such as, for example, para-toluenesulfonic acid, sulfoacetic acid, sulfosalicylic acid, or the like, and thereafter reacting the thus-produced 3,20-diacyloxy-16,20-pregnadiene with about a molar equivalent of a peracid such as, for example, perbenzoic acid or peracetic acid in a solvent such as, for example, methylene chloride, benzene, toluene, acetic acid, mixtures of these, and others. Conveniently, the products of the present invention can be prepared from the corresponding 3-hydroxy or 3-acyloxy-16-pregnene - 20 - one without isolating the intermediate compounds. For instance, treating 3β-acetoxy-16-pregnene-20-one with isopropenyl acetate in the presence of para-toluenesulfonic acid, removing the excess isopropenyl acetate, dissolving the residue in methylene chloride and cooling, followed by the successive addition of about one molar equivalent of peracetic acid and bromine is productive of 3β-acetoxy-16(17)-oxido-21-bromopregnane-20-one.

The following examples are illustrative of the process and products of the present invention but are not to be construed as limiting.

*Example 1.—3β,20-diacetoxy-16,20-allopregnadiene*

Two grams of 3β-acetoxy-16-allopregnene-20-one [Marker et al., J. Am. Chem. Soc., 64, 468 (1942)], twenty milliliters of isopropenyl acetate and 0.1 gram of para-toluenesulfonic acid were placed in a reaction flask to which was attached a short fractionating column. The mixture was heated to boiling and a mixture of acetone and isopropenyl acetate distilling between 56 and ninety degrees centigrade was collected over a period of from about eight to ten hours. The para-toluenesulfonic acid was then neutralized by addition of solid sodium bicarbonate and the excess isopropenyl acetate was thereafter removed under reduced pressure. Cold water and methylene chloride were added with stirring to the residue. The methylene chloride layer was separated, washed with water, dried over anhydrous sodium sulfate and the solvent then removed by distillation. The residue, on crystallization from acetone, gave 1.4 grams of 3β,20-diacetoxy-16,20-allopregnadiene which melted at 143 to 145 degrees centigrade and had an $[\alpha]_D^{24}$ of plus ten degrees (0.979 percent in chloroform).

*Example 2.—3β,20-diacetoxy-16(17)-oxido-20-allopregnene*

A solution of 1.2 grams (0.003 mole) of 3β,20-diacetoxy-16,20-allopregnadiene in ten milliliters of chloroform and ten milliliters of benzene was cooled in an ice and salt bath and 4.15 milliliters (00.4 mole) of a 1.93 normal benzene solution of perbenzoic acid was then added thereto. The reaction mixture was maintained at about zero degrees centigrade for sixteen hours, whereafter the solution was diluted with ether and washed with an ice-cold dilute sodium carbonate solution. The ether solution was then washed with two portions of water and then with a saturated salt solution and thereafter dried with anhydrous sodium sulfate. The solvent was then removed under reduced pressure and the residue recrystallized from Skellysolve B (hexane hydrocarbons) to yield 0.95 gram of product melting at 127 to 129 degrees centigrade. Recrystallization of these crystals from the same solvent was productive of 3β,20-diacetoxy-16(17)-oxido-20-allopregnene, melting at 128 to 131 degrees centigrade, and having an $[\alpha]_D^{24}$ of plus thirty degrees (0.589 percent in chloroform). Infrared and ultraviolet absorption analyses confirmed the structure.

*Analysis.*—Percent calculated for $C_{25}H_{36}O_5$: C, 72.08; H, 8.71; acetyl, 20.66. Found: C, 71.96; H, 8.74; acetyl, 20.10.

*Example 3.—3β-acetoxy-16(17)-oxido-21-bromoallopregnane-20-one*

A solution of 0.416 gram (0.001 mole) of 3β,20-diacetoxy-16(17)-oxido-20-allopregnene was cooled in an ice-salt bath to about minus ten degrees centigrade and 9.25 milliliters (0.001 mole) of a 0.216 normal methylene chloride solution of bromine was then added dropwise thereto, with stirring, during a period of one hour. The solvent was thereafter removed at reduced pressure at a temperature below room temperature. The white crystalline residue was crystallized from a mixture of acetone and pentane to produce product melting at 184 to 187 degrees centigrade. Recrystallization of these crystals from acetone gave 3β-acetoxy-16(17)-oxido-21-bromoallopregnane-20-one, melting at 188 to 190 degrees centigrade and having an $[\alpha]_D^{24}$ of plus 45 degrees (0.819 percent in chloroform). Infrared spectrum was consistent with the theoretical structure.

*Analysis.*—Percent calculated for $C_{23}H_{33}BrO_4$: C, 60.92; H, 7.34; Br, 17.63. Found: C, 60.91; H, 7.27; Br, 17.99.

The structure of the thus-produced 3β-acetoxy-16(17)-oxido-21-bromoallopregnane-20-one was confirmed by conversion to the known 3β,21-diacetoxy-16(17)-oxidoallopregnane-20-one in the following manner: A mixture of 0.2 gram of the above-obtained 3β-acetoxy-16(17)-oxido-21-bromoallopregnane-20-one, 0.15 gram of powdered sodium iodide, and ten milliliters of acetone was refluxed for fifteen minutes and then filtered. There was then added to the filtrate 1.5 grams of postassium bicarbonate and 0.9 milliliter of acetic acid, whereafter the mixture was refluxed with stirring for twelve hours. The whole was then diluted with water and extracted with ether. The ether solution was successively washed with a cold dilute sodium thiosulfate solution, water, and a saturated sodium chloride solution, and thereafter dried with anhydrous sodium sulfate. The solvent was then removed under reduced pressure and the residue crystallized from methanol to yield 0.12 grams of white crystalline product melting at 145 to 148 degrees centigrade. Recrystallization of these crystals from a mixture of acetone and pentane produced 3β,21-diacetoxy-16(17)-oxidoallopregnane-20-one, which melted at 151 to 152.5 degrees centigrade.

Additional illustrations of the scope of the present invention are as follows:

In the manner given in the preceding examples, 3β-acetoxy-16(17)-oxido-21-bromopregnane-20-one is prepared by reacting 3β,20-diacetoxy-16(17)-oxido-20-pregnene with about one molar equivalent of bromine. The 3β,20-diacetoxy-16(17)-oxido-20-pregnene is prepared by reacting 3β,20-diacetoxy-16,20-pregnadiene with about one molar equivalent of perbenzoic acid in benzene. The 3β,20-diacetoxy-16,20-pregnadiene is prepared by reacting 3β-hydroxy- or 3β-acetoxy-16-pregnene-20-one with isopropenyl acetate in the presence of para-toluenesulfonic acid.

In the manner given in the preceding examples, 3α-acetoxy-16(17)-oxido-21-bromoallopregnane-20-one is prepared by reacting 3α,20-diacetoxy-16(17)-oxido-20-allopregnene with about one molar equivalent of bromine. The 3α,20-diacetoxy-16(17)-oxido-20-allopregnene is prepared by reacting 3α,20-diacetoxy-16,20-allopregnadiene with about 1 molar equivalent of perbenzoic acid in benzene. The 3α,20-diacetoxy-16,20-allopregnadiene is prepared by reacting 3α-hydroxy- or 3α-acetoxy-16-allopregnene-20-one with isopropenyl acetate in the presence of para-toluenesulfonic acid.

Similarly, other 3α- or 3β-acyloxy-16(17)-oxido-21-bromoallo and normal pregnene-20-ones are prepared by reacting 3α- and 3β,20-diacyloxy-16(17)-oxido- allo and normal -20-pregnenes with about one molar equivalent of bromine in a solvent such as, for example, methylene chloride, chloroform, benzene, toluene, acetic acid, mixtures of these, and others. The 3,20-diacyloxy-16(17)-oxidopregnenes are prepared by reacting 3,20-diacyloxy-16,20-pregnadienes with about one molar equivalent of an organic peracid such as, for example, perbenzoic acid or peracetic acid, in a solvent such as above-named. The 3,20-diacyloxy-16,20-pregnadienes are prepared by reacting a 3-hydroxy or 3-acyloxy allo or normal pregnane-20-one with isopropenyl acetate or other isopropenyl acylate in the presence of an acidic catalyst, such as, for example, para-toluenesulfonic acid, sulfoacetic acid, sulfosalicylic acid, and others. Other isopropenyl acylates may be used in the method of the present invention but isopropenyl acetate is preferred for matters of convenience and economy. When the starting compound is a 3-acyloxy-16-pregnene-20-one, the final product is not dependent upon the selected isopropenyl acylate, as the enol ester of the 20-keto group is subsequently removed upon bromination. The acyloxy groups of the above-named compounds are of the formula AcO, Ac being the acyl radical of acids such as, for example, formic, acetic, propionic, butyric, valeric, hexanoic, heptanoic, octanoic, benzoic, phenylacetic, cyclopentylcarboxylic, cyclohexylcarboxylic, and others, depending upon the starting material and acylating agent used.

It is to be understood that the invention is not to be limited to the exact details of operation of exact compounds shown and described as obvious modifications and equivalents will be apparent to one skilled in the art and the invention is therefore to be limited only by the scope of the appended claims,

I claim:

1. A 3-acyloxy-16(17)-oxido - 21 - bromopregnane-20-one wherein the acyloxy group has the formula AcO, Ac being the acyl radical of a hydrocarbon carboxylic acid containing from one to eight carbon atoms, inclusive.

2. $3\beta$ - acetoxy - 16(17) - oxido-21-bromopregnane-20-one.

3. $3\beta$-acetoxy-16(17)-oxido-21-bromoallopregnane-20-one.

4. $3\alpha$ - acetoxy - 16(17) - oxido-21-bromopregnane-20-one.

5. A process for the production of a 3-acyloxy-16(17)-oxido - 21 - bromopregnane-20-one which comprises: reacting a 3,20-diacyloxy-16(17)-oxido-20-pregnene wherein the acyloxy groups have the formula AcO, Ac being the acyl radical of an organic carboxylic acid, with about one molar equivalent of bromine to produce a 3-acyloxy-16(17)-oxido-21-bromopregnane-20-one.

6. A process for the production of $3\beta$-acetoxy-16(17)-oxido - 21 - bromopregnane-20-one which comprises: reacting $3\beta$,20-diacetoxy-16(17)-oxido-20-pregnene with about one molar equivalent of bromine to produce $3\beta$-acetoxy-16(17)-oxido-21-bromopregnane-20-one.

7. A process for the production of $3\beta$-acetoxy-16(17) - oxido - 21 - bromoallopregnane - 20 - one which comprises: reacting $3\beta$,20 - diacetoxy-16(17)-oxido-20-allopregnene with about one molar equivalent of bromine to produce $3\beta$-acetoxy-16(17)-oxido-21-bromoallopregnane-20-one.

8. A process for the production of a 3-acyloxy-16(17)-oxido - 21 - bromopregnane-20-one which comprises: reacting a 3,20-diacyloxy-16,20-pregnadiene, wherein the acyloxy groups have the formula AcO, Ac being the acyl radical of an organic carboxylic acid containing from one to eight carbon atoms, inclusive, with about one molar equivalent of an organic peracid at a temperature between about minus forty degrees centigrade and about forty degrees centigrade to produce a 3,20-diacyloxy-16(17)-oxido-20-pregnene, and reacting the thus-produced 3,20-diacyloxy-16(17)-oxido - 20 - pregnene with about one molar equivalent of bromine to produce a 3-acyloxy-16(17)-oxido - 21 - bromopregnane-20-one.

9. A process for the production of $3\beta$-acetoxy-16(17)-oxido - 21 - bromopregnane-20-one which comprises: reacting $3\beta$,20-diacetoxy-16,20-pregnadiene with about one molar equivalent of an organic peracid at a temperature between about minus forty degrees centigrade and about forty degrees centigrade to produce $3\beta$,20-diacetoxy-16(17)-oxido-20-pregnene, and reacting the thus-produced $3\beta$,20 - diacetoxy-16(17)-oxido-20-pregnene with about one molar equivalent of bromine to produce $3\beta$ - acetoxy-16(17)-oxido-21-bromopregnane-20-one.

10. A process for the production of $3\beta$-acetoxy-16(17)-oxido-21-bromoallopegnane-20-one which comprises: reacting $3\beta$,20-diacetoxy-16,20-allopregnadiene with about one molar equivalent of an organic peracid at a temperature between about minus forty degrees centigrade and about forty degrees centigrade to produce $3\beta$,20-diacetoxy-16(17)-oxido-20-allopregnene, and reacting the thus-produced $3\beta$,20-diacetoxy-16(17)-oxido-20-allopregnene with about one molar equivalent of bromine to produce $3\beta$-acetoxy-16(17)-oxido-21-bromoallopregnane-20-one.

11. A process for the production of a 3-acyloxy-16(17)-oxido - 21 - bromopregnane-20-one which comprises: reacting a compound selected from the group consisting of 3-hydroxy-16-pregnene-20-ones and 3-acyloxy-16-pregnene-20-ones, wherein the acyloxy groups have the formula AcO, Ac being the acyl radical of an organic carboxylic acid, with an isopropenyl acylate in the presence of an acidic catalyst, reacting the thus-produced 3,20-diacyloxy-16,20-pregnadiene with about one molar equivalent of an organic peracid at a temperature between about minus forty degrees centigrade and about forty degrees centigrade to produce a 3,20-diacyloxy-16(17)-oxido-20-pregnene, and reacting the thus-produced 3,20-diacyloxy-16(17)-oxido - 20 - pregnene with about one molar equivalent of bromine to produce a 3-acyloxy-16(17)-oxido-21-bromopregnane-20-one.

12. A process for the production of $3\beta$-acetoxy-16(17)-oxido - 21 - bromoallopregnane - 20 - one which comprises: reacting $3\beta$-hydroxy-16-allopregnene-20-one with isopropenyl acetate in the presence of an acidic catalyst, reacting the thus-produced $3\beta$,20 - diacetoxy-16,20-allopregnadiene with about one molar equivalent of an organic peracid at a temperature between about minus forty degrees centigrade and about forty degrees centigrade to produce $3\beta$,20-diacetoxy-16(17)-oxido-20-allopregnene, and reacting the thus-produced $3\beta$,20 - diacetoxy-16(17)-oxido-20-allopregnene with about one molar equivalent of bromine to produce $3\beta$-acetoxy-16(17)-oxido-21-bromoallopregnane-20-one.

13. A process for the production of $3\beta$-acetoxy-16(17)-oxido - 21 - bromopregnane-20-one which comprises: reacting $3\beta$-hydroxy-16-pregnene-20-one with isopropenyl acetate in the presence of an acidic catalyst, reacting the thus-produced $3\beta$,20-diacetoxy-16,20-pregnadiene with about one molar equivalent of an organic peracid at a temperature between about minus forty degrees centigrade and about forty degrees centigrade to produce $3\beta$,20 - diacetoxy-16(17)-oxido-20-pregnene, and reacting the thus-produced $3\beta$,20-diacetoxy-16(17)-oxido-20-pregnene with about one molar equivalent of bromine to produce $3\beta$-acetoxy-16(17)-oxido-21-bromopregnane-20-one.

References Cited in the file of this patent

UNITED STATES PATENTS

| Number | Name | Date |
|---|---|---|
| 2,359,772 | Marker | Oct. 10, 1944 |
| 2,369,065 | Marker | Feb. 6, 1945 |
| 2,599,481 | Plattner | June 3, 1952 |